United States Patent Office 3,518,775
Patented July 7, 1970

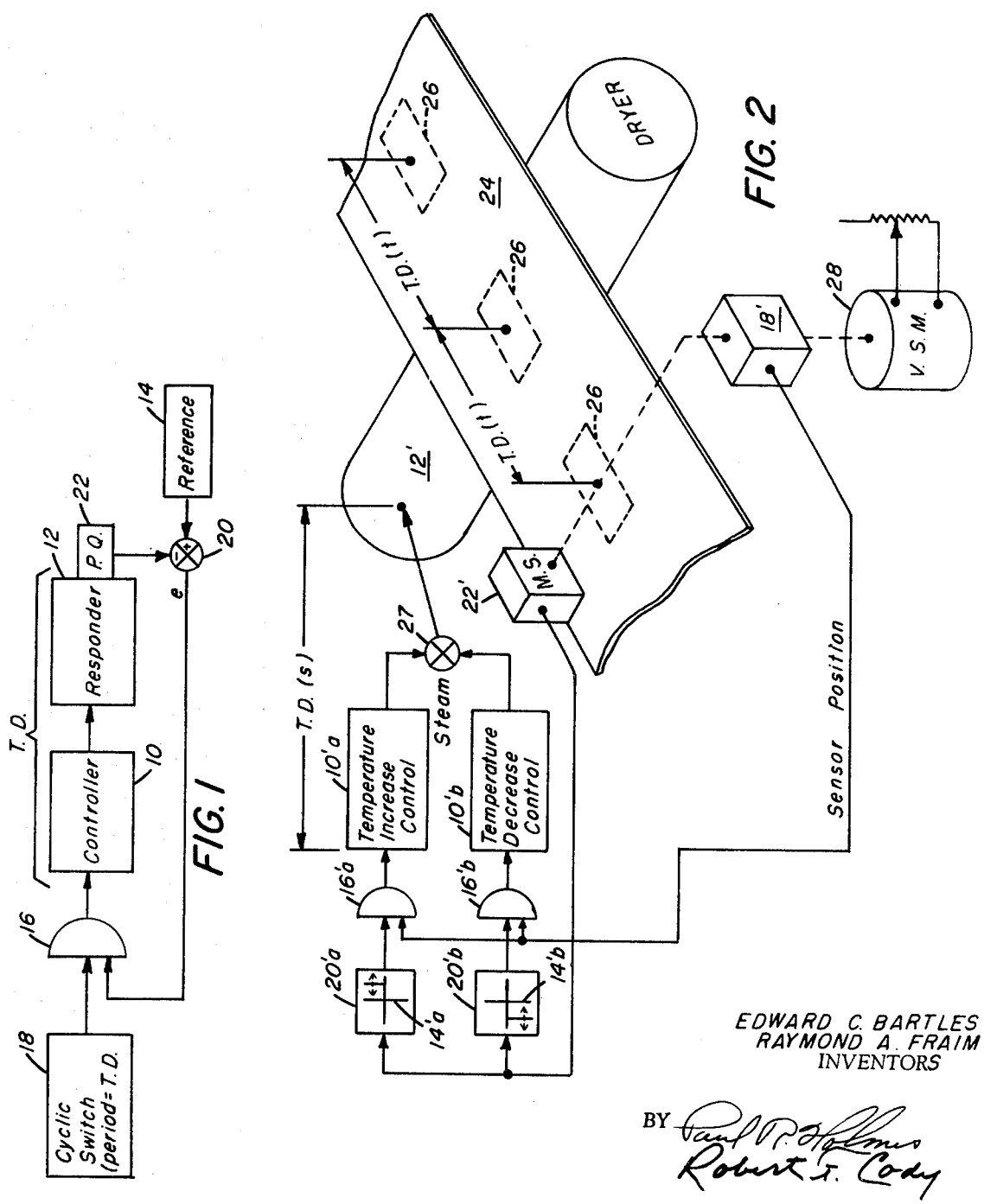

---

3,518,775
MOISTURE CONTROL SYSTEM
Edward C. Bartles and Raymond A. Fraim, Rochester, N.Y., assignors to Eastman Kodak Company, Rochester, N.Y., a corporation of New Jersey
Filed Nov. 25, 1968, Ser. No. 778,395
Int. Cl. F26b *19/00*
U.S. Cl. 34—48          6 Claims

ABSTRACT OF THE DISCLOSURE

A moisture control system for use in papermaking is disclosed as employing a traversing moisture sensor, the traversal time of which is made compatible with the thermal time constant of a dryer stage for such paper.

BACKGROUND OF THE INVENTION

Field of the invention

Figure 3:
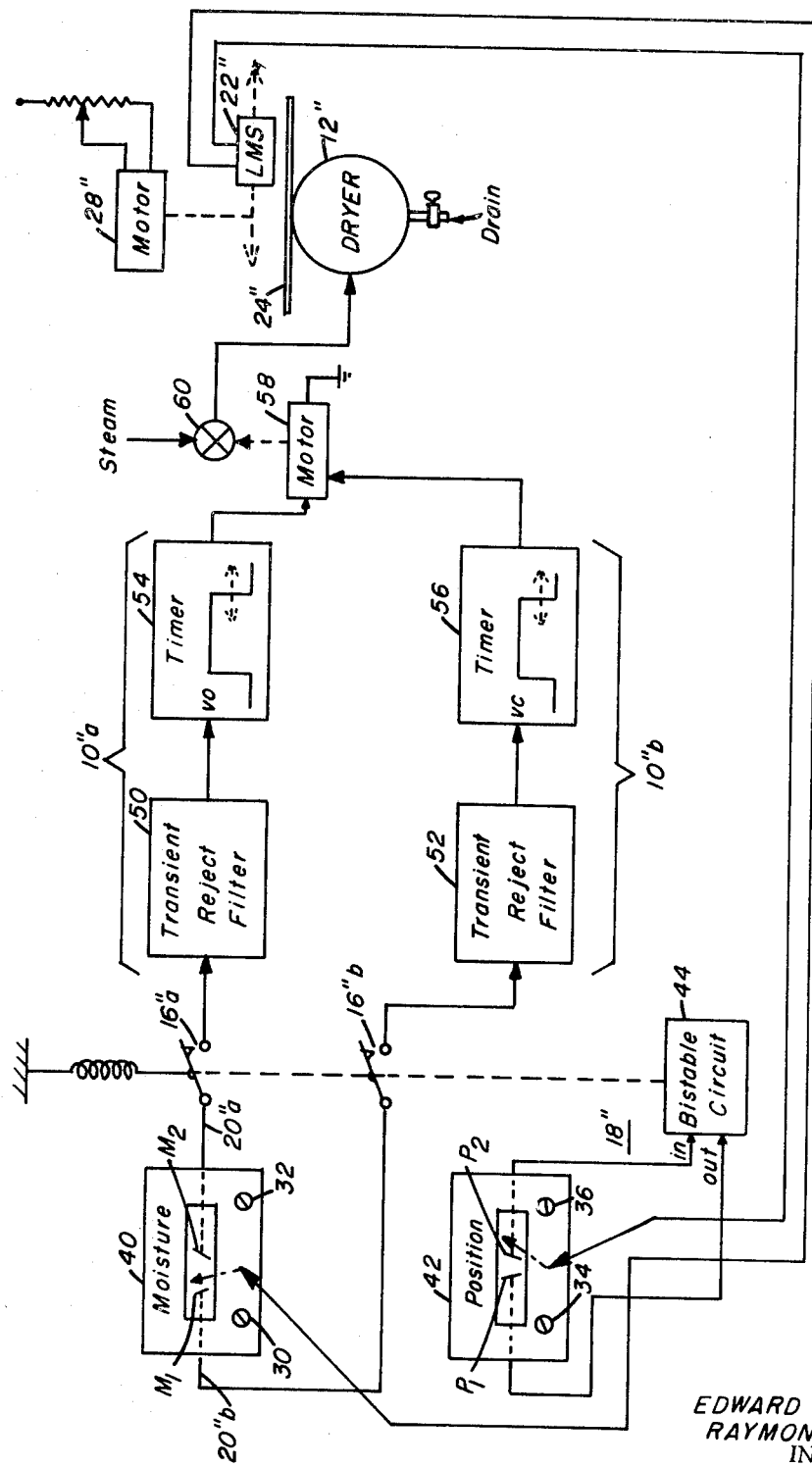

This invention relates to automatic control systems; and in particular to automatic temperature control systems. As presently employed, the invention is embodied in a system for the manufacture of paper, serving to regulate the moisture content of such paper. The expression "Time Constant" and especially as it applies to thermal time constant within this specification, is defined as the time that it takes for an element, at one temperature, to be changed to a second temperature assuming that the rate of change of temperature between such first and second temperatures is maintained constant. For more on thermal time constants, see: "Physics," Shortley and Williams, Prentice-Hall, Inc., N.Y., 1950, pages 360–362.

Description relative to the prior art

The moisture content of paper during its manufacture has a direct bearing on the quality of such paper. To keep the moisture level of paper within certain prescribed limits, the paper is passed through a thermally controlled dryer stage, which quite commonly is steam operated. The particular system over which the present invention provides an improvement employs automatic temperature control of its dryer stage, doing so by sensing paper moisture and, in response thereto, controlling the flow of steam into the dryer stage. The problem with such an arrangement is that the moisture level of paper is subject to frequent transient variations; and since steam control of the dryer has an inherently long time constant, i.e., the initial thermal impact of steam is barely reflected in a dryer temperature change, the instantaneous dryer temperature is rarely at the level that it ought to be for a given moisture condition. (It should be noted that long time constants, while especially troublesome in a steam-dependent system, are also apparent in other forms of drying apparatus.) As a result, steam is continually applied to the dryer as the automatic control system in question follows up and hunts for its null.

It has been suggested that the particular problem of the prior art system under discussion may be obviated by the incorporation therein of appropriate lead and/or lag devices or circuits whereby, say, anticipatory quantities of steam may be applied to the dryer in response to moisture representative signals. While such an expedient would undoubtedly work, it would require appreciable and costly modifications to the moisture control system.

Paper manufacturers often employ a traversing moisture sensor in their systems for moisture-recording purposes. U.S. Pats. Nos. 3,214,845 (Huffman) and 2,951,007 (Lippke) indicate such systems; and similarly, the system modified by means of the invention also includes a traversing sensor, viz. a Lippke sensor.

SUMMARY OF THE INVENTION

Moisture control according to the invention provides for a cyclic sampling of moisture in a moving paper web; and such sampling is at a rate which is compatible with the inherent time constant of the moisture control system. (The expression "compatible with" as used herein means "equal to or greater than"). Apparatus according to the invention implements this concept by sensing for moisture at a preselected widthwise location (window) of the paper web; and by matching the traversal time of its (Lippke) sensor to the system time constant. It will be appreciated that, in a properly operating system, moisture content and dryer temperature (relative to respective references) vary as direct functions of each other: By cyclically sampling moisture, a comparison is, in effect, cyclically made between an instantaneous dryer temperature and a commanded temperature, the time delay inherent in changing the dryer temperature being effectively cancelled by such cyclic comparisons. The invention contemplates using such cyclic comparisons to control tightly the above-noted moisture-temperature relationship on a cycle to cycle basis.

An object of the invention is to provide an automatic control system, the inherent time constant thereof being effectively cancelled by cyclically controlling such system at intervals proportional to such time constant.

Another object of the invention is to provide an automatic control system which cyclically adjusts the temperature of an element thereof at intervals proportional to the time that it takes for a regulator therein to influence such temperature in a commanded manner.

Another object of the invention is to provide an automatic system for controlling the moisture content of paper during its manufacture, such system being adapted to regulate the heat applied to a dryer stage for such paper by cyclically sensing the moisture within such paper at intervals proportional to the time constant for applying heat to the dryer stage.

Another object of the invention is to use the traverse time of a traversing moisture sensor to cancel the effect of delays inherent in the application of heat to a dryer within a papermaking system.

The invention will be described with reference to the figures, wherein

FIG. 1 is a block diagram illustrating a control system according to the invention, FIG. 2 is a schematic illustration showing the invention incorporated in a papermaking system; and employed to control automatically the moisture content of such paper, and FIG. 3 is a block diagram of a presently preferred form of papermaking system, as in FIG. 2.

As above stated, the invention can find many and varied uses. FIG. 1 has been provided for the purpose of describing some of the broad implications of the invention; and to facilitate an understanding of the details which are indicated in connection with FIGS. 2 and 3. Corresponding parts found in FIGS. 1, 2 and 3 are, respectively, provided with no, single and double primes.

With reference to FIG. 1, a controller 10 and responder 12 cooperate to cause the responder to track a reference condition established by a source 14 thereof. When the controller 10 commands the responder 12 to change its condition, a time delay T.D. obtains before such responder 12 can fully react to its input. To assure that the responder 12 is fully responsive to a given input command before responding to any subsequent (e.g., transient) input(s), the invention provides that the controller 10 apply subsequent input command(s) to the responder 12 only if the previous command(s) thereto was (were) insufficient to bring the responder 12 to the reference condition. This requires that the controller 10 be cyclically operated, at intervals corresponding to the time delay T.D., whereby the effect of such time delay is eliminated from the system. An AND gate circuit 16—cyclically turned on by means of a switch 18—operates the controller 10 in accordance with the error $e$ (comparator 20) between the reference 14 and responder 12 conditions (pick-off 22).

With the above as background, reference should now be had to FIG. 2 which shows the concepts of FIG. 1 practiced in the manufacture of paper; and wherein the cyclic traversal of a moisture sensor is employed to advantage to provide cyclic gating of error signals.

A paper web 24 is conveyed, during its manufacture, over a dryer drum 12' to which steam is applied in amounts depending on the moisture content of the paper. A sensor 22', driven by means of a (variable speed) motor 28, travels back and forth, widthwise across the paper web 24, registering the moisture content of such paper. A transducer 18', which may be a simple suitably tapped potentiometer, produces a gate signal whenever the moisture sensor 22' occupies a certain widthwise position of the web 24, as indicated by the dashed "window" 26. A pair of threshold circuits 20'a and 20'b receive the moisture-representative signal from the sensor 22'. If the moisture within the paper is above a certain amount, as determined by a high moisture reference which is set into the threshold circuit 20'a, such circuit produces an output signal; if such moisture is below a certain amount, as determined by a low moisture reference which is set into the threshold circuit 20'b such circuit produces an output signal. Output signals from the threshold circuits 20'a and 20'b are respectively applied to AND gate circuits 16'a and 16'b which are both cyclically turned on whenever the moisture sensor 22' occupies a window 26 position. In the event that the paper moisture level is too high when the sensor 22' is at a window 26, the gate circuit 16'a applies a signal to operate a valve (27)-actuating temperature controller 10'a for increasing the steam into the dryer 12'; if the moisture level is too low when the sensor 22' occupies a window 26, the gate circuit 16'b applies a signal to a valve (27)-actuating temperature controller 10'b for decreasing the steam into the dryer 12'.

As is known, the application of heat, say by means of steam into a plenum, has an inherent time constant; and such is symbolically represented on FIG. 2 as "T.D.($s$)". Therefore, to equate paper moisture and dryer temperature, as noted above, the invention purposes that the speed of the motor 28 be so set that the traversal time of the sensor 22', indicated on FIG. 2 as "T.D.($t$)", matches the time constant T.D.($s$). In this way, each window sampling of moisture becomes, in effect, a comparison of the instantaneous dryer 12' temperature with a reference dryer temperature for a given moisture condition; and each window sampling serves to set the temperature controllers 10'a and 10'b until the next such sampling. Thus, the temperature controllers 10'a and 10'b and valve 27 do not continually, futilely, hunt in-between, and during, successive window sampling.

It should be noted that the temperature controllers 10'a, 10'b may, without departing from the spirit of the invention, either control the application of heat in proportion to the magnitude of output signals from the threshold circuit 20'a, 20'b, or simply by preset discrete amounts whenever the threshold circuits 20'a, 20'b produces output signals. This latter technique has been incorporated in the presently preferred embodiment of the invention, and which embodiment is indicated in FIG. 3:

Reference should now be had to FIG. 3. A traversing Lippke moisture sensor 22" is driven to and fro across the width of a paper web 24" by means of a motor 28". The Lippke sensor produces two signals: one representing the moisture content of the paper web immediately beneath the sensor 22"; the other representing the lateral position of the sensor 22" with respect to the web 24". A steam operated dryer 12" is employed to control the moisture content of the paper web 24".

The position and moisture signals are applied to respective indicator control meters 40, 42 such, for example, as those manufactured by API Instruments Co., 7100 Wilson Mills Rd., Chesterland, Ohio, Model 603K. Meters such as these are provided with adjustment screws 30, 32, 34, 36 for setting high and low limit markers, $M_1$, $M_2$, $P_1$, $P_2$. The screw 30 may be set so that the meter 40 produces a line 20"b signal whenever the pointer of the meter 40 falls below a certain threshold moisture level $M_1$; similarly the screw 32 may be set so that the meter 40 produces a line 20"a signal whenever the pointer of the meter 40 goes above a certain threshold moisture level $M_2$. The widthwise window of the paper web 24" which is to be examined for moisture is likewise selected by setting the screws 34, 36. As the pointer of the meter 42 enters ($P_2$) the selected window, a signal is applied to a bistable circuit 44, e.g., a flip flop circuit and complementing relay, which closes the relay switches 16"a and 16"b; as the pointer of the meter 42 leaves ($P_1$) the window, a signal is applied to the bistable circuit 44 causing the relay to drop out, and its switches 16"a, 16"b to open. In a properly operating system, the pointer of the meter 42 will oscillate back and forth, tracking the position of the Lippke sensor 22"; and the pointer of the meter 40 will reside within the boundary defined by the markers $M_1$, $M_2$ of the meter 40.

It should be appreciated that the meter 42, bistable circuit 44 and switches 16"a, 16"b cooperate to form an AND gate circuit 18" which is cyclically turned on at intervals defined by the speed of the motor 28"; and such intervals are deliberately made compatible with the time that it takes for steam to be conveyed to the dryer 12", as discussed above.

In its presently preferred form, the moisture representative signals from the meter 40 are applied through respective transient reject filters 50, 52, wherein short term spurious moisture signals are eliminated. While electronic low-pass filters would work for this purpose, the preferred form of the invention employs electronic clocks as inexpensive filters. Each such clock is triggered into operation by an input from the meter 40, and produces an output signal only if the duration of its input signal is greater than a certain amount, thereby eliminating short lived moisture signals. Clock circuits such as those manufactured by Industrial Timer Corp., 351 U.S. Highway 287, Parsippany, N.J., Model 60S are recommended.

It is indicated above that in this, the preferred form of the invention, steam is, for sake of simplicity, applied to the dryer 12" in preset discrete amounts. To this end, the invention employs timing circuits 54, 56 for operating a motor 58 for a preset time, in either of two directions to open or close, respectively, a valve 60. The durations defined by the timers 54, 56 are so selected that in the event the moisture limits ($M_1$, $M_2$) are passed through, the change in steam to the dryer 12", commanded at a given meter 42 window, will be just about sufficient to position the pointer of the meter 40 approximately midway between its markers $M_1$, $M_2$ prior to the start of the next meter 42 window. And since the duration between the windows is made to match the delayed effect of dryer steam, just one such application or exhausting of steam is all that is ever necessary to restore, without hunting, the desired dryer temperature and wet moisture conditions.

The invention has been described in detail with particular reference to preferred embodiments thereof, but it will be understood that variations and modifications can be effected within the spirit and scope of the invention. A typical variation, for example, would be to disable the drive for the traversing sensor 22″, thereby to freeze the sensor at a given widthwise location of the web 24″. It would then become necessary to simulate the sensor traversal time, for example, by cyclically operating the switches 16″a and 16″b, say by means of a free-running pulse generator.

We claim:
1. Apparatus of controlling the moisture of a web comprising
  (a) dryer means disposed to heat said web,
  (b) a moisture sensor cooperative with said web to produce a signal representing the moisture therein,
  (c) means responsive to said moisture sensor for applying heat to said dryer means and having therewith a certain time constant, and
  (d) means for operating said means for applying heat at discrete intervals proportional to said time constant.

2. The apparatus of claim 1 wherein said means for operating said means for applying heat comprises
  (a) drive means for effecting traversal of said web by said moisture sensor, and
  (b) gate means for applying the sensor output signal to said means for applying heat when said sensor has a predetermined location with respect to said web,
the traversal time of said sensor being compatible with said time constant.

3. The apparatus of claim 2 wherein said means for operating said means from applying heat further includes threshold means for preventing sensor output signals which are within a predetermined range from being applied to said means for applying heat to said dryer means.

4. The apparatus of claim 5 wherein said means for applying heat to said dryer applies steam thereto.

5. In a papermaking system having controls for regulating the moisture content of such paper during manufacture thereof, said system having a dryer stage, means for applying heat to said dryer stage, a sensor, means for causing said sensor to traverse cyclically to and fro across said paper to produce a signal representing the moisture content of such paper at the instant position of said sensor, the improvement wherein
  said means for causing said sensor to traverse is adapted to cause traversal at a rate compatible with the thermal time constant of said dryer stage and said means for applying heat thereto, and wherein said system includes means for use in gating said sensor output signal to said means for applying heat when said sensor has a predetermined location with respect to said paper.

6. The system of claim 5 wherein said means for use in gating the sensor output signal is adapted to produce an output signal only when the said sensor signal is above or below respective threshold levels.

References Cited

UNITED STATES PATENTS

| | | | |
|---|---|---|---|
| 2,197,823 | 4/1940 | Young | 34—48 X |
| 2,659,987 | 11/1953 | Bennett | 34—48 |
| 2,951,007 | 8/1960 | Lippke | 162—198 |
| 3,214,845 | 11/1965 | Huffman | 34—48 |
| 3,260,642 | 7/1966 | Canter | 162—198 X |

CARROLL B. DORITY, Jr., Primary Examiner

U.S. Cl. XR.

162—198

PO-1050
(5/69)

UNITED STATES PATENT OFFICE
CERTIFICATE OF CORRECTION

Patent No. 3,518,775      Dated July 7, 1970

Inventor(s) Edward C. Bartles and Raymond A. Fraim

It is certified that error appears in the above-identified patent and that said Letters Patent are hereby corrected as shown below:

Column 4, line 71: "wet" should read -- web -- .
Column 5, line 35: "claim 5" should read -- claim 3 -- .

SIGNED AND
SEALED
NOV 17 1970

(SEAL)
Attest:

Edward M. Fletcher, Jr.
Attesting Officer

WILLIAM E. SCHUYLER, JR.
Commissioner of Patents